Figure 1:
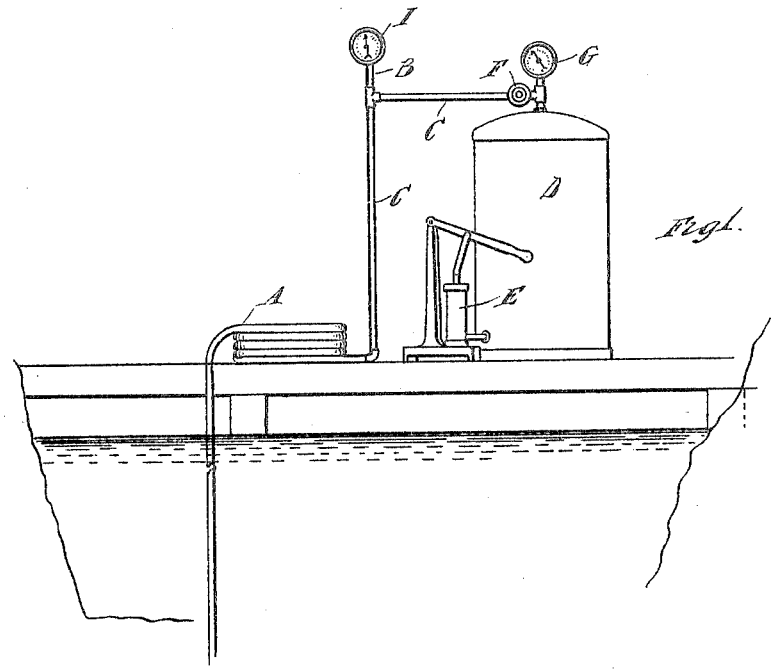

No. 804,570. PATENTED NOV. 14, 1905.
E. S. WHEELER.
BATHOMETER.
APPLICATION FILED OCT. 17, 1904.

WITNESSES
T. G. Massey
C. F. Day

INVENTOR
Eben S. Wheeler
By Parker & Burton Attorneys.

UNITED STATES PATENT OFFICE.

EBEN S. WHEELER, OF DETROIT, MICHIGAN.

BATHOMETER.

No. 804,570. Specification of Letters Patent. Patented Nov. 14, 1905.

Application filed October 17, 1904. Serial No. 228,725.

*To all whom it may concern:*

Be it known that I, EBEN S. WHEELER, a citizen of the United States, residing at Detroit, county of Wayne, State of Michigan, have invented a certain new and useful Improvement in Bathometers; and I declare the following to be a full, clear, and exact description of the invention, such as will enable others skilled in the art to which it pertains to make and use the same, reference being had to the accompanying drawings, which form a part of this specification.

This invention relates to bathometers. It has for its object an improved apparatus for measuring and indicating the depth of water.

In the course of experiments made by me with the apparatus which is shown and described in Patent No. 734,785, issued to me July 28, 1903, I have found that it is not practical to use a large metal bulb or a large metal receptacle at the lower end of the bathometer if the bathometer is to be used with a moving vessel, and especially if it be desired to drag the bathometer behind the moving vessel at or near the bottom of the water for the purpose of determining water depths or for the purpose of locating elevations of the bottom or projections from the bottom, especially if the elevations be rocks or wrecks, it almost always happens that the bulb or enlarged receptacle at the lower end of the bathometer catches on some obstruction and is pulled off. I have found, however, that if a considerable length of tube be out behind a moving vessel when the bulb is so pulled off the bathometer still continues to indicate and register, or both, and if enough tube be out so that a length of it drags on the bottom it will indicate quite accurately the depth of the water. My experiments and observations have led me to conclude that when the bottom of the tube of the bathometer is open water enters until an equilibrium of pressure is produced between the air that is contained in the tube and the pressure of the water, and if sufficient length of tube be out so that the compression of the air in the tube does not reduce the bulk of the air to an extent to drive it back in the tube beyond the part that lies along the bottom the indication and registration will accurately indicate and register the depth of the water. The indication in every case shows to what point the water rises in the tube by indicating to what depth the air in the tube extends. I have found that if there be a free or substantially free escape for air from the bottom end of the tube and I pump or otherwise force air into the top end of the tube while still keeping the top end of the tube in connection with the indicating and registering apparatus the indicator will show accurately the depth to which the bottom end of the tube is immersed. The pressure in the tube cannot be increased beyond that which is sufficient to drive all the water out of the tube, and it can be increased until all the water is driven out of the tube. Of course this does not take into account the slight resistance due to the friction of the air through the tube, which is compensated for by regulating the indicating-dial in a way to be hereinafter explained, and it does not take into account a source of error which would arise from the adhesion of particles of water to the inner walls of the tube if the tube had been filled or partly filled with water. This latter source of possible error is obviated or reduced to a minimum by the introduction of a check-valve, which will be explained hereinafter.

Figures 2, 3, 4:
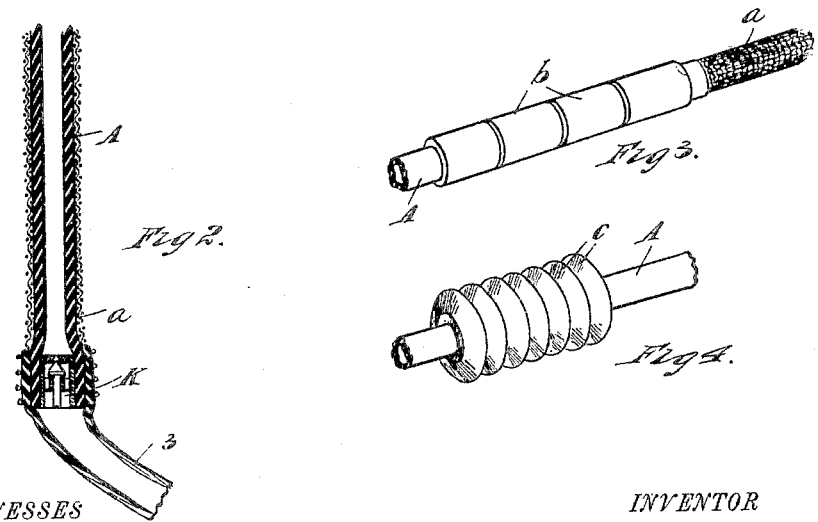

In the drawings, Figure 1 shows the apparatus, consisting of an air-receiver, means for producing air-pressure therein, and the connections between the air-receiver and the bathometer-tube. Fig. 2 shows, on a large scale, the lower end of the bathometer-tube. Fig. 3 shows a means of armoring or weighting the lower end of the bathometer-tube. Fig. 4 shows a second and, perhaps, preferable way of weighting the lower end of the bathometer-tube.

A indicates the bathometer-tube, which is provided at its upper end with branching connections B and C. Of these the connection B leads to an indicating-gage I. The other branch C leads to a tank D, into which air is compressed by any suitable means, as by a hand-pump E. Preferably there is a gage G on the tank D and a hand-valve F in the pipe C, which leads from the tank to the bathometer-tube A. For purposes of accurate measurement these are all the parts that are required; but the action of the apparatus is more prompt if a check-valve K be placed in the lower end of the bathometer-tube A. The check-valve opens outward to allow the substantially free escape of the air from the tube, but closes to prevent the ingress of water into the tube. If the water gain access to the tube and be blown or forced out by the air, some parts of the water will adhere to the walls of the tube and produce an increase of frictional resistance between the air and the walls of the channel through which it is flowing and tend to introduce error into the reading on the indicator, which in time will adjust themselves, but which adjust themselves slowly and interfere with the quick response of the indicator to a change in depth of the bottom end of the tube, and it is therefore desirable to exclude the water to the greatest possible extent from the interior of the tube. Preferably a short piece 3 of quite flexible tubing is placed below the check-valve K to guard the check-valve itself from fouling with mud or sand.

To preserve the tube A, I preferably armor it with a flexible covering of either metal wire or cord. Such a covering of textile material or cord is indicated at $a$. In addition to the armor of the tube I cover the lower end or that part of it which may possibly be subjected to frictional contact with the sand at the bottom of the water with short pieces of pipe $b$ or with disks $c$. (Shown in Fig. 4.) If the armoring is mainly for weighting purposes or partly to sink the end of the line, the pieces of tube or the disks are of metal. If, however, it be intended to drag the end of the line over a sandy bottom or over any shallow bottom, that part of it which is liable to rub along the bottom should be covered with short pieces of rubber tubing, which my experience has shown will outwear either iron tubing or wire armor under these conditions.

The reading on the indicator is increased by the amount of the frictional resistance due to the length of the tube and the bore of the tube, and this can be determined for each bathometer-tube and the reading corrected either by deducting from the total reading the amount that has been previously determined to be due to the resistance of the tube, or the indicating-chart on the gage may be properly adjusted to cause the indicator to read zero when the air is flowing freely through the tube and the tube is entirely out of the water, and it will then properly indicate the depth of the water when immersed.

In use a supply of air is pumped into the receiver D and confined therein under pressure considerably exceeding any pressure that may be expected to be produced in the bathometer-tube. The air is allowed to escape from the tank into the bathometer-tube past a restricting-valve F, which does not allow it to pass freely. The end of the bathometer-tube is dropped into the water, and the pressure of the water confines the air in the tube until the air in the tube has been raised to a pressure corresponding to the depth to which the end of the tube sinks. As the air in the tank D is at a higher pressure, there is a constant tendency to raise the pressure in the bathometer-tube, which, however, is constantly met and equalized by the escape of the air from the lower end and the air in the bathometer-tube remains constantly at exactly the pressure of the water at the open end of the tube, and this pressure is registered constantly on the indicator I. The gage G shows the pressure of the air in the tank D and indicates the necessity of increasing that whenever the pressure in the tank D falls nearly to the pressure indicated on the gage I.

The details of the mechanism employed to utilize what I consider to be the discovery that I have made may be varied greatly, provided only they utilize a natural law which may be stated briefly as this: If air be forced through a tube the lower end of which is submerged in fluid, the air-pressure at the upper end of the tube, which is necessary to cause the air to flow through it, will equal the fluid-pressure at the lower end of the tube. If the air-pressure at the upper end be measured and thus becomes known, then the water-pressure at the lower end is also known, and since the depth of water is a linear function of the pressure the depth also becomes known, and I consider that my invention broadly covers the production of a means which shall employ this law of nature for the purpose of indicating or recording or making known such pressures and the depth of water and similar fluid.

What I claim is—

1. In a bathometer, in combination with an open-ended tube, a flexible tubular guard terminal thereto, a check-valve at the junction of the tube and guard, and means for supplying air to said tube, substantially as described.

2. In a bathometer, in combination with an air-containing tube, an indicator connected thereto at the upper end, means for furnishing a continuous supply of air under pressure to the tube at its upper end, means for preventing an inflow of water into said tube at its lower end, a flexible tubular guard extending said tube below the means for preventing an inflow of water, substantially as described.

3. In a bathometer, in combination with a tube, means for supplying air under pressure to the upper end of said tube, means whereby the air may escape from the lower end of said tube, a check-valve opening outwardly to prevent water from entering said tube at its lower end, and a guard of flexible material extending beyond the check-valve, substantially as described.

4. In combination with a bathometer-tube, an armor for the lower end thereof, consisting of short pieces of tubular material threaded on said tube, substantially as described.

5. In a bathometer, in combination with a tube provided with means for the introduction of air thereinto at one end and for the escape of air therefrom at the other end, a flexible terminal guarding the escape end of said tube, means to prevent the entrance of water into said tube, said means being located at the junction of the flexible terminal and the main tube, and an indicator adapted to indicate the pressure of air in said tube, substantially as described.

In testimony whereof I sign this specification in the presence of two witnesses.

EBEN S. WHEELER.

Witnesses:
  MAY E. KOTT,
  CHARLES F. BURTON.